Sept. 30, 1958 B. BAKKE 2,853,907
DEVICE FOR THE "OPENING" OF GLASS CUTS
Filed Aug. 17, 1953 2 Sheets-Sheet 1

2,853,907

DEVICE FOR THE "OPENING" OF GLASS CUTS

Björn Bakke, Minde, Bergen, Norway

Application August 17, 1953, Serial No. 374,689

Claims priority, application Norway March 25, 1953

5 Claims. (Cl. 81—5.1)

This invention relates to an instrument or tool for separating, severing or dividing flat sheets of glass, such as plate glass, polished plate glass, sheet glass and the like (hereinafter called "flat glass" to distinguish same from "formed glass," such as for example drinking glasses) after a dividing line or groove has been cut or scored in the surface of such flat glass.

When cutting flat glass, particularly flat glass which is intended to be used for window panes, mirrors or the like, it is usual to use a glass cutter and a ruler or spline along which the glass cutter is guided. By this means a narrow groove is cut or scored in the glass, said groove having a depth which is substantially less than the total thickness of the glass. Therefore, said groove represents a line along which the strength of the glass is much less than the other parts of the glass. When correct manual or other force or pressure is applied to the glass at or near such groove, the glass will have a tendency to break more readily along such groove than at other places, but a certain degree of skill must of course be used to ensure that the break occurs along the weakened line in the glass represented by the cut groove. A skilled craftsman will make a clean and neat separation of the glass.

Before the division, separation or severance of the glass as described can take place, the glazier or artisan must "open" the cut. This is done by making the glass crack or split along the entire length of the cut groove. If this "opening" is not effected correctly the crack or split in the glass may diverge from the cut groove and render the glass useless.

For the correct understanding of the invention, some generally known phenomena when sheet materials are subject to tensile stresses or strains will now be described.

When a sheet material is subject to manual forces by bending, stretching, applying pressure in a restricted area or the like, tensile stresses occur in the sheet material. The sheet may also possess tensioned areas due to unequalness or unevenness during the manufacture of the sheet. Thus it is possible upon the sheet to draw lines, along which the tensile stresses are substantially of the same direction and strength, such lines are in the following being referred to as "tension lines."

As soon as the tension in a material reaches a certain limit, cracks in the material will occur. Such cracks follow those points in the material wherein the break resistance is lower than the tension along said points. In an isotropic material, say flat glass, therefore, the cracks will follow the lines of maximum tension. However, if the flat glass is substantially weakened along a certain line, it is a greater possibility that the tension along said line will reach the break resistance of the material before the break resistance is reached at other places and the flat glass may split through along the weakened line. But if the forces applied cause tension in the flat glass with the tension lines running non-parallel to (diverging from) said weakened line, it may happen that the tension along one such line substantially exceeds the break resistance of the weakened line. If the difference between the tension along said non-parallel line and the tension along the weakened line is greater than the difference between the break resistance along said two lines, the flat glass will not split along the weakened line, but along the line of maximum tension.

The above mentioned characteristics should be remembered when considering the action of force applied to flat glass, in which a narrow groove has been cut by means of a glass cutter.

If it is desirable to separate flat glass along a straight line, a narrow groove is therefore cut in the glass along the desired line and manual forces applied to the glass in the neighborhood of the groove, for example by bending, so that tensile stresses exceeding the break resistance along the weakened line represented by the groove occur in the glass. A crack in the glass, preferably following said weakened line along the groove, is thus obtained. If the forces applied are sufficient and the tension lines resulting from said forces run in the desired direction, that is to say along the groove, it will be possible to split the flat glass entirely through a certain part along said groove, and when the artisan sees that the split has started correctly, he follows same up by exerting a very gentle additional force to have the glass split through along the entire groove from edge to edge, to obtain a clean and neat severance of the two parts of the glass along the desired line.

The operation just described to obtain a starting crack or split along the cut groove, is commonly called to "open" the cut. By further "opening" as described the crack tends to follow the cut along its entire length. However, although a cut may be entirely opened, i. e., the crack or split may run from edge of the glass, the two parts may still be more or less firmly bonded together by the adhesion forces of the material. When cutting along a more or less straight line such adhesion forces are very small, and the "opening" of the cut and severance of the parts, therefore, may take place in a single operation.

When a cutting is more complex, i. e., having a pronounced or complex or closed curvature it is difficult and in many instances impossible to obtain tension lines in the flat glass running along the groove in substantially the same direction thereof. In such case, those skilled in the art will try to "open" the cut step-wise, that is to say they will first try to get a starting or crack or split along a short length of the curved cut. Thereafter they will move a short distance beyond the split along the cut and repeat the operation to open the cut another step and so continue step-by-step around the curved cut.

It should be remembered that around the point where the crack terminates an area with high internal tensile stresses in the flat glass is obtained. Therefore, it is relatively easy to obtain further "opening" of the curved cut, but of course the artisan must be careful not to permit the break to run outside the cut and thereby spoil the glass. By applying further gentle pressure in the neighbourhood of the point where the crack or split terminates, said crack or split is lengthened along the cut groove until it reaches the far edge, or in the case of cutting a closed curvature, the starting point of the cut. Now the cut is fully opened. However, in the case of a more arcuated curved cut, the adhesion forces of the glass may be considerable so that the severance of the two parts of the glass divided by the cut may have to follow in a separate operation. Therefore, opening of the cut and severance of the parts should be regarded as, and are in fact, two different operations when cutting along more arcuated curved lines. However, as mentioned in the foregoing, when opening a straight cut, the adhesion forces between the parts are small and the parts separate easily.

According to the present invention the improved means or device for "opening" the glass cut (as above described) applies a pressure to the glass plate upon the opposite side to that in which the weakened groove is cut, while supporting the glass, during the application of such pressure, at the side in which the cut is made, so that tension lines running concentrically around the cut are produced.

An instrument according to the invention comprises a pair of co-operating jaws, one of said jaws having means for supporting the cut side of the glass, the other of said jaws having means for applying a pressure to the glass upon the opposite side to that in which the cut is made.

Further features of the invention will appear from the following description of an instrument according to the invention, with reference to the accompanying drawing which illustrates one particular embodiment of the instrument by way of example, and in which:

Figure 3 is a detail in plan view of the upper jaw of the instrument.

Figures 4 to 7 are sections along the lines VI—VI to IX—IX respectively, of Figure 2.

Figure 1:
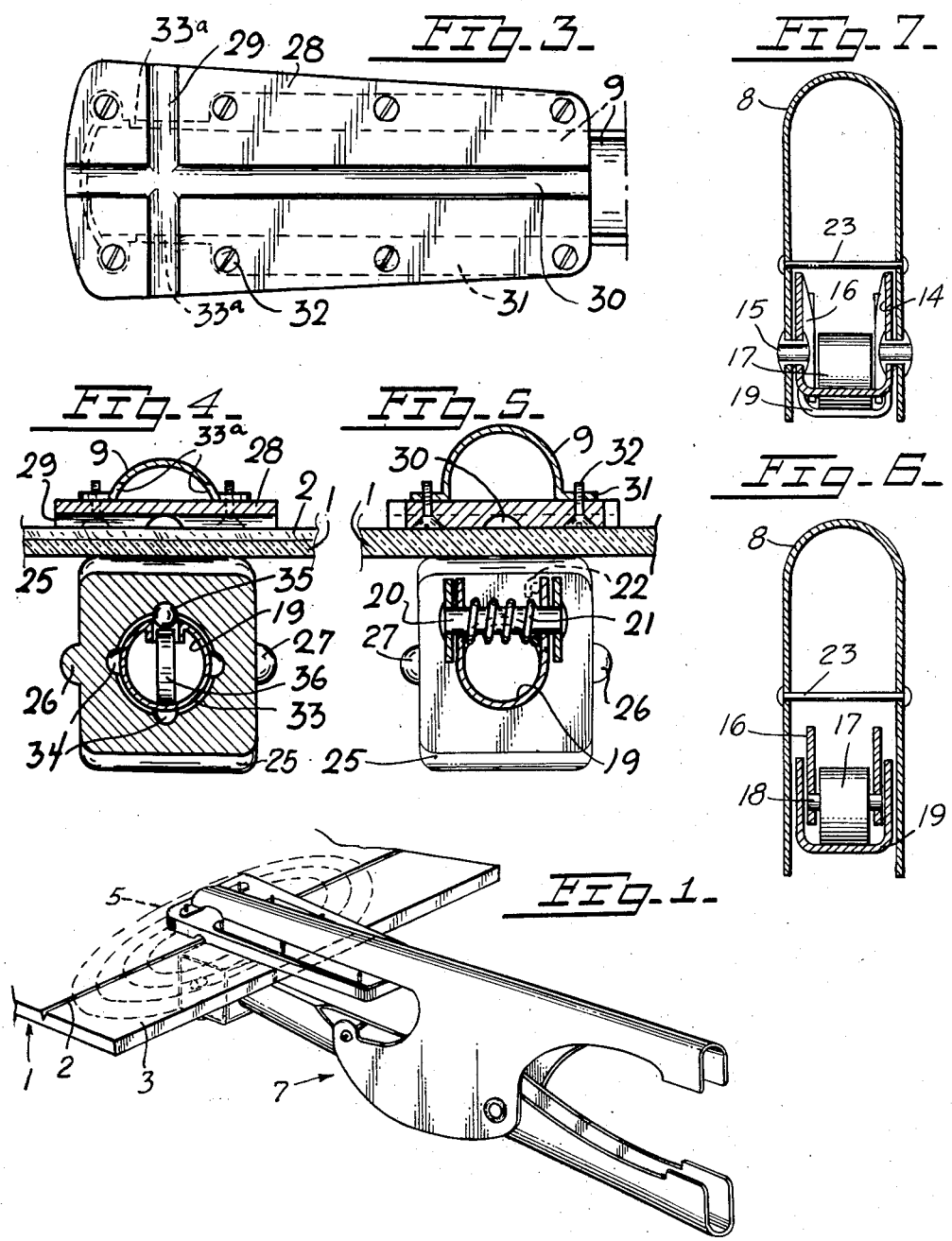
Figure 1 is a perspective view of an instrument according to the invention being used to open a glass cut in a pane of glass.

The desire according to the present invention and illustrated in Figure 1, is shown generally at 7. This instrument will be described more in detail hereinafter. By means of this instrument the glass is supported upon its upper side, that is to say the side in which the cut is usually made, while a pressure is simultaneously applied to the glass upon its side opposite to that of the cut. Hence, the tension lines indicated at 5 will extend more or less concentrically around the cut, that is to say around the area of application of pressure.

Referring now more particularly to Figures 2 to 7, the instrument 7 according to a preferred form for the invention comprises an upper lever generally indicated by the reference numeral 8. Preferably said upper lever consists of a single piece of sheet metal, bent into inverted U or channel section, the web of such channel constituting the back or upper straight part of such lever. This lever 8 has a forwardly extending upper jaw 9 and a rearwardly extending handle 10, and intermediate its ends each side flange of such lever has a downwardly extending part 11 from which an arm 12 projects forwardly, below the upper jaw 9 to a point approximately halfway along the length of said jaw to form a slot 13 into which the glass 1 is received. Between the lower ends of the arms 11 is pivotally mounted a lower lever 14 by means of a pivot pin 15 intermediate the ends of such lever handle. This lever also consists of a strip of sheet metal bent into U or channel section as shown, and its inner end is bifurcated at 16 to receive a roller 17 rotatably mounted on an axle or pin 18. Said roller is adapted to engage the inner end of another lever 19, which intermediate its ends is pivotally mounted between the forward ends 12 of the arms 11 by means of a pivot pin 20. Said lever 19 also consists of a strip of sheet metal, which for a part of its length, that is to say from its inner end and to slightly forward of the pivot pin 20, is bent into U or channel section, the roller 17 engaging the bottom or web of such lever. The part of said lever forward of the pin 20 is bent into cylindrical form for the purpose hereinafter described. Upon the pivot pin 20 there is a spring 21 one end of which is attached to the pin 20 and its other end attached to a lug 22 upon the lever 19. The spring 21 thus holds the lever handle 14 and the lever 19 in the slightly open position shown upon Figure 2. When therefore the outer end of the handle 14 is moved towards the handle 10, the roller 17 will set upon the inner end of the lever 19 and swing its outer, cylindrical end against the upper jaw 9. As soon as the pressure upon the handles 10 and 14 is released the spring will return the parts to their normal position shown in Figure 2. In order to arrest the upward tilt of the inner end of the lower lever 14 there is a stopper of some kind, for example a pin 23 between the parts 11 of the upper lever 10.

Figure 2:
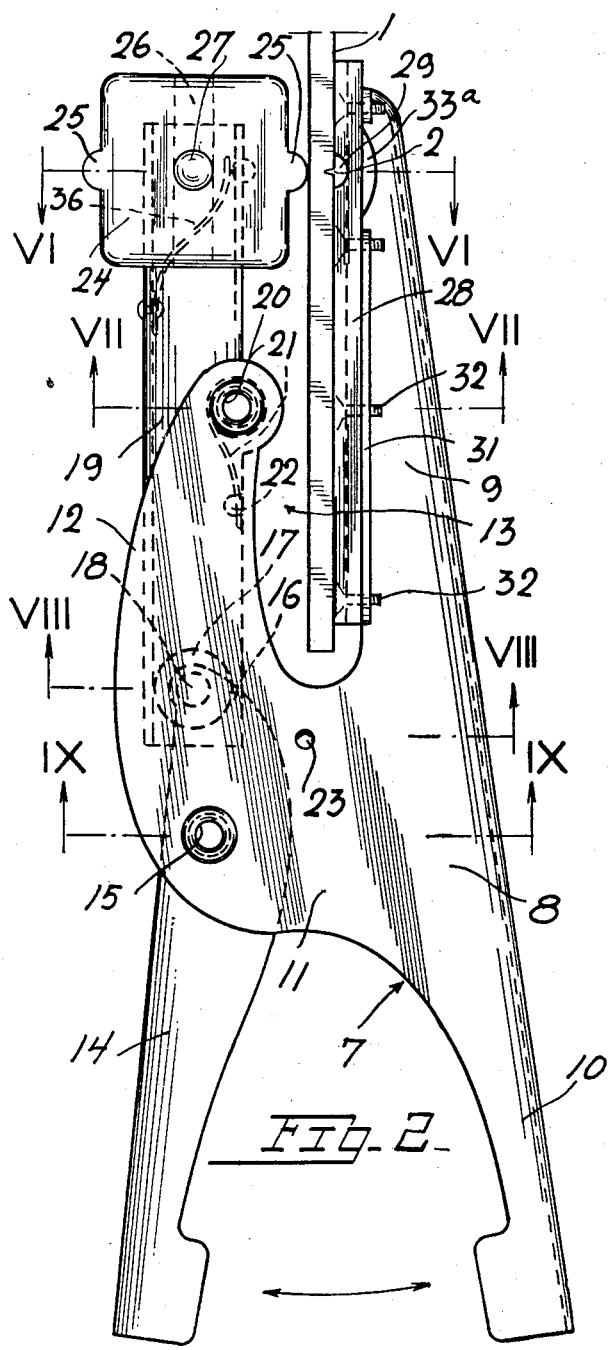
Figure 2 is a side view of the instrument on an enlarged scale.

The outer cylindrical end of the lever 19 is provided with a cube-formed or die-formed pressure head 24, which is mounted to turn concentrically about such cylindrical end, that is to say, to turn about an axis parallel to the main or longitudinal axis of the instrument as shown in Figure 2 of the drawings. In this manner four of the faces of such head lying parallel to the main of the lever 19 may in turn be turned to face the underside of the upper jaw 9 in a position to co-operate with said upper jaw, said head also having means for locking it in each of said four positions, as will be described more in detail in the following. The head 24 consists of a relatively hard material and forms the second jaw of the instrument. Each of the four faces of the head, adapted to be swung in a position to cooperate with the upper jaw 9, carries pressure protrusions 25, 26 or 27. The protrusions 25 and 26 are rib-formed, while the protrusion 27 has the form of a dome in the centre of the corresponding face of the head. There are two rib-formed protrusions 25 which extend at right angles to the main axis of the device, as shown upon Figure 2, while the third rib-formed protrusion 26 extends parallel to the main axis of the device, as illustrated by dotted lines.

The configuration of said various pressure protrusions are only given as examples, and may be varied as desired.

The underside of the upper jaw 9 is provided with a plate member 28 in which grooves 29, 30 are cut in the side facing the head 24 and adapted to co-operate with the protrusions 25, 26 or 27 thereon. These grooves, which thus may be said to represent weakened lines or areas along the upper plate jaw member, are therefore cut according to a pattern to correspond with the protrusions 25, 26 or 27. Therefore, in the position of the pressure head as shown in Figure 2 of the cross-cut grooves 29 and 30, the groove 29 cut transversely to the main axis of the device is adapted to co-operate with the upper rib-formed protrusion 25. By turning the head 24 clockwise through an angle of 90° the rib-formed protrusions 26 will be brought in position to be co-operative with the groove 30 which is cut parallel to the main axis of the instrument. The next rib-formed protrusion 25 is also adapted to co-operate with the transverse groove 29, while the dome-formed protrusion 27 will engage the junction or point of intersection between the transverse groove 29 and the longitudinal groove 30. The plate member is secured to outwardly directed flanges 31 of the jaw 9 by means of screws 32 or the like so that one plate member may be readily exchanged by another member having another pattern of grooves when desired. The lower side of the upper jaw is provided with a recess 33a in the region of the transverse groove 29 in the plate 28. For the correct action of the instrument it is immaterial whether the grooves 29, 30 in the plate face the pressure head 24 or the upper jaw. In the latter instance the side of the plate 28 facing the pressure head will be smooth.

The plate 28 is preferably made of a suitable transparent plastic, for example the type known under the registered trade mark "Perspex" and a plate of a certain thickness may be exchanged by plates of different thicknesses corresponding to the thickness of the glass to be cut or other characteristics of the glass in question.

The pressure head 24 is preferably made of a suitable thermosetting plastic. The material should be not too hard, but of a sufficient strength, and a correct choice of material for the head may be paramount to obtain a device with optimal working properties. If found necessary the head may of course also be exchanged by another having another preferred form of protrusions.

When flat glass 1 provided with a cut 2 is received in the gap 13 between the plate 28 and the pressure head 24, the groove cut 2 must follow the groove 29, as shown upon Figure 2, and in the following the operation of the device shall be described more in detail.

As shown upon Figure 4 of the drawings the pressure head 24 has a central bore having an annular recess 33 in a plane transversely to the axis of said bore, into which the cylindrical end of the lever 19 is received. Said annular recess 33 has four semi-spherical recesses 34 each one of which is placed diametrically opposite another such recess. A ball 35 is resiliently received in the cylindrical end of the lever 19 and adapted to co-operate with and to be received in each one of a recess 34 and thereby to lock the head 24, in its adjusted position, after being turned. The ball is subject to the pressure of a spring 36, the pressure of which may be adjustable by means (not shown) which also may be used to unlock and remove the head from the lever 19. Such device as described is usually called a "ball lock."

The device described in the foregoing is used as follows:

The jaws of the instrument are caused to embrace the flat glass 1 as shown in Figures 1 and 2 of the drawings, with the plate 28 against that side of the glass in which a cut 2 is made and with one of its grooves, in the example the groove 29, placed directly above and along cut 2. The head 24 has of course been turned to such position that a suitable protrusion, in the example the protrusion 25, runs straight below the cut. By applying a suitable manual pressure upon the handles 10 and 14 such pressure is by the co-operation between the groove 29 in the plate 28 and the protrusion 25 on the head 24, transmitted to opposite sides of the glass 1, thereby creating a tensional area in the glass with the tension lines running concentrically around the cut 2 and the groove 29 as well as the protrusion 25. When a sufficient pressure has been applied to the glass in the manner described, the glass cracks and splits through for a certain distance along the groove 2, that is to say preferably parallel to the tension lines, without entirely splitting along the cut and thereby not entirely separating the strip 3 from the remaining part 1 of the glass. If the strip 3 is not too long a slightly higher pressure upon the handles 10 and 14 after the initial "opening" operation described may bring the glass to split completely through along the entire length of the groove. If the strip 3 is comparatively long this "opening up" operation is continued step-by-step until the entire length of the cut has been "opened" to separate or divide the strip 3 from the remaining part of the glass leaving a smooth even breakline.

In the example shown the transverse groove 29 and its associated transverse protrusion 25 has been used, but by turning the head 24 in a clockwise direction from the position shown in Figure 2, the longitudinal protrusion 26 may be swung into place to co-operate with the longitudinal groove 30 in the plate 28. Also in this instance the device is used as described in the foregoing.

If the cut 2 follows a more or less complex curve it may be an advantage to use the longitudinal and the transverse grooves and protrusions as well as the dome-formed protrusion 27, when proceeding step-by-step along the cut. Therefore it may sometimes be an advantage to have also curved grooves and protrusions on the device, although this may be less important.

Instead of the sliding connection between the handle 14 and its associated lever 19 as shown in the drawing, any other suitable connection may be used, such as for example a link-connection. However, it is important to use a connection which transmits maximum pressure to and creates maximum tension in the glass, with a minimum of manual force applied to the handles 10 and 14. The lever system described in the foregoing and shown in the drawings, will fulfill these conditions.

While there is shown and described the at present preferred embodiment of the invention, it will be understood that various changes in the details of the construction and in the form and arrangement of parts may be made without departing from the scope of the invention as defined by the appended claims.

What I claim is:

1. An instrument for opening a cut in one surface of a glass sheet; said instrument comprising two cooperating jaws movable toward and away from each other and adapted to receive a glass sheet therebetween with the cut surface of the glass sheet facing toward one of said jaws, a plate member on said one jaw having a flat surface engageable with the cut surface of the glass sheet over a substantial area of the latter at opposite sides of the cut therein, said plate member having at least one groove in said flat surface thereof facing toward the other jaw and adapted to be aligned with a cut in the glass sheet received between said jaws, said groove having a lateral dimension which is substantially smaller than the dimension of the plate member in the corresponding direction so that substantial areas of said flat surface of the plate member remain at opposite sides of the groove for facial contact with the glass sheet, and means on said other jaw operative to exert a pressure against the other surface of the glass sheet in alignment with the cut in the latter so that the cut is progressively opened while said plate member supports the glass sheet to prevent extreme bending of the latter about the cut and rapid severance of the sheet.

2. An instrument according to claim 1; wherein said plate member is formed of a transparent plastic resin.

3. An instrument according to claim 1; wherein said plate has two grooves therein extending at right angles to each other so that the glass sheet can be disposed with the cut thereof aligned with the most convenient of said grooves; and wherein said means on the other jaw includes a rotatable head having several active faces selectively positionable opposite said plate member, at least two of said faces having straight ribs protruding therefrom and arranged so that the rib on one of said active faces is aligned with one of said grooves when said one active face is positioned opposite said plate member, and the rib on another active face is aligned with the other of said grooves when said other active face is positioned opposite said plate member.

4. An instrument according to claim 3; wherein still another of said active faces has a dome-shaped protrusion aligned with the intersection of said grooves in the plate member when said head is disposed to position the last mentioned face thereof opposite said plate member to permit use of the instrument in opening a curved cut.

5. An instrument according to claim 3; wherein said head is mounted for rotation about the longitudinal axis of said other jaw and said faces are parallel to axis of rotation of the head, and further comprising means yieldably retaining said head in any one of several selected rotational positions wherein the respective faces of the head are positioned opposite said plate member.

References Cited in the file of this patent

UNITED STATES PATENTS

| | | |
|---|---|---|
| 787,122 | Semmer | Apr. 11, 1905 |
| 2,005,487 | Zamanek | June 18, 1935 |
| 2,212,599 | Hall | Aug. 27, 1940 |